United States Patent
Shi et al.

(10) Patent No.: US 12,082,298 B2
(45) Date of Patent: Sep. 3, 2024

(54) METHOD AND APPARATUSES FOR UE GROUPING

(71) Applicant: LENOVO (BEIJING) LIMITED, Beijing (CN)

(72) Inventors: Jie Shi, Beijing (CN); Zhi Yan, Beijing (CN); Lianhai Wu, Beijing (CN); Jing Han, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 259 days.

(21) Appl. No.: 17/421,961

(22) PCT Filed: Jan. 18, 2019

(86) PCT No.: PCT/CN2019/072381
§ 371 (c)(1),
(2) Date: Jul. 9, 2021

(87) PCT Pub. No.: WO2020/147122
PCT Pub. Date: Jul. 23, 2020

(65) Prior Publication Data
US 2022/0095094 A1 Mar. 24, 2022

(51) Int. Cl.
*H04W 68/02* (2009.01)
*H04W 8/18* (2009.01)

(52) U.S. Cl.
CPC ........... *H04W 8/186* (2013.01); *H04W 68/02* (2013.01)

(58) Field of Classification Search
CPC .............................. H04W 8/186; H04W 68/02
USPC ....................................................... 455/458
See application file for complete search history.

(56) References Cited

U.S. PATENT DOCUMENTS

2012/0083293 A1* 4/2012 Bejerano ............... H04W 68/02
455/458
2013/0015953 A1* 1/2013 Hsu ........................ H04W 4/08
340/7.46

FOREIGN PATENT DOCUMENTS

WO 2018035224 A1 2/2018

OTHER PUBLICATIONS

International Searching Authority, "Written Opinion of the International Searching Authority", PCT/CN2019/072381, Oct. 16, 2019, pp. 1-5.
Qualcomm Incorporated, Discussion on UE-group wake-up signal for NB-Iot, 3GPP TSG-RAN WG1 #94bis, R1-1810923, Oct. 8-12, 2018, pp. 1-5, Chengdu, China.
Lenovo, Motorola Mobility, Consideration on wake up signal, 3GPP TSG RAN WG2 Meeting #103bis, R2-1814766, Oct. 8-12, 2018, pp. 1-3, Chengdu, China.
Mediatek Inc., UE Group Wake-up Signal in NB-IOT, 3GPP TSG-RAN WG2 Meeting #104, R2-1816956, Nov. 12-16, 2018, pp. 1-5, Spokane, WA, USA.
Nokia, Nokia Shanhai Bell, Analysis of Group WUS Options, 3GPP TSG-RAN WG2 Meeting #104, R2-1817048, Nov. 12-16, 2018, pp. 1-5, Spokane, USA.

(Continued)

*Primary Examiner* — Joel Ajayi
(74) *Attorney, Agent, or Firm* — Kunzler Bean & Adamson

(57) ABSTRACT

Methods and apparatuses for UE grouping are disclosed. A method at a remote unit comprises: receiving grouping rule information; and computing a group_ID based on at least the grouping rule information.

14 Claims, 5 Drawing Sheets

(56) References Cited

OTHER PUBLICATIONS

Huawei, Hisilicon, UE-Group based Wake-up signal, 3GPP TSG-RAN WG2 Meeting #103bis, R2-1813915, Oct. 8-12, 2018, pp. 1-3, Chengdu, China.
3GPP, "3rd Generation Partnership Project; Technical Specification Group GSM/EDGE Radio Access Network; Cellular system support for ultra-low complexity and low throughput Internet of Things (CIoT) (Release 13)", 3GPP TR 45.820 V13.1.0, Nov. 2015, pp. 1-495.
3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.1.0, Dec. 2018, pp. 1-411.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.8.0, Sep. 2018, pp. 1-331.
3GPP, "3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.3.0, Sep. 2018, pp. 1-127.
3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.3.0, Sep. 2018, pp. 1-918.

* cited by examiner

METHOD AND APPARATUSES FOR UE GROUPING

FIELD

The subject matter disclosed herein generally relates to wireless communications and, more particularly, to methods and apparatuses for UE grouping.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Multiple-Input Multiple-Output (MIMO), Physical Uplink Shared Channel (PUSCH), Physical Uplink Control Channel (PUCCH), Physical Downlink Shared Channel (PDSCH), Time division multiplexing (TDM), Code division multiplexing (CDM), Orthogonal Cover Code (OCC), Narrow Band Internet of Things (NB-IoT), wake up signal (WUS), paging occasion (PO), Identity (ID), Mobile Originating (MO), Mobile Terminated (MT), Circuit Switch (CS), Packet Switch (PS), Discontinuous Reception (DRX), Extended Discontinuous Reception (eDXR), Mobility Management Entity (MME), enhanced machine type of communication (eMTC), System Information Block (SIB), Radio Resource Control (RRC), Core Network (CN).

In NB-IoT technology, a wake up signal (WUS) mechanism is introduced for power saving, wherein the WUS indicates whether there is a paging process in a pre-defined paging occasion (PO).

Specifically, when the WSU mechanism is disabled, a UE always monitors paging messages on POs. When the WUS mechanism is enabled, the UE only monitors the following possible paging messages in POs in response to the UE receiving a WUS. PDCCH blind detection is used for monitoring the PO. On the other hand, when the WUS mechanism is enabled, the UE will stop monitoring the following paging messages in POs in response to the UE not receiving its WUS.

In R15, multiple UEs paged in the same PO may be associated to a same WUS. For example, ten (10) UEs monitor the same WUS. In this condition, if any one of the ten UEs is paged, the WUS will be sent. All of the ten UEs will receive the WUS. Therefore, all of the ten UEs including the paged UE and the other nine UEs that are not paged have to monitor the paging since the WUS is received. Since no actual paging information for the other nine UEs will be received, it is power wasting for these nine UEs to perform the PDCCH blind detection for paging.

To reduce this false alarm probability, in NB-IOT/eMTC R16 WI (Work Item), UE-group wake-up signal (WUS) is supported. So far, only UE_ID based grouping is agreed. For example, if the number of groups (N) is 4, ten UEs could be grouped into 4 groups by UE_IDs mod N. That is, UEs with IDs 1, 5 and 9 are in group1, UEs with IDs 2, 6 and 10 are in group2, UEs with IDs 3 and 7 are in group3, and UEs with IDs 4 and 8 are in group4. The group4 may be named as group0.

Accordingly, if UE1, UE5 and UE9 are in the same group, the paging to UE1 will only trigger UE5 and UE9 to monitor the following paging, the other UEs that are not in the same group (for example, UEs 2-4, 6-8 and 10) do not need to monitor the paging. Therefore, only the UEs in the same group will monitor the same WUS and trigger the paging monitoring by this common WUS.

The UE_ID based grouping does not consider the services performed by the UEs. For example, some UEs are busy at night, some UE are busy in the morning. In other words, a service may be time-specific. It is obvious that if the UEs that are necessary to be paged at the same time are grouped together, then paging alarm probability can be reduced and the power saving can be achieved.

Although the above-described service-based grouping seems beneficial, it is not easy to describe the service-based grouping.

In this disclosure, we propose new parameters and methods to implement the UE grouping.

BRIEF SUMMARY

Methods and apparatuses for UE grouping are disclosed.

In one embodiment, a method at a remote unit comprises: receiving grouping rule information; and computing a group_ID based on at least the grouping rule information.

In some embodiment, the grouping rule information indicates that the group_ID is computed based on one of UE_ID-based grouping, service-based grouping, and two-level grouping. The two-level grouping includes service-based and service-based grouping, or service-based and UE_ID-based grouping, or UE_ID-based and service-based grouping. In the condition of the service-based grouping or a first level or a second level of the two-level grouping being service-based grouping, the method further comprising: receiving a parameter used in grouping, wherein the parameter is one of paging probability, service period, rating or frequency of service, and rating or frequency of service in a fixed cycle. In particular, the paging probability is related to paging times in a first period T1 and the number of paging occasions in a second period T2, while the service period is related to a period of paging in the remote unit or a time gap between two continuous pagings.

In some embodiment, in the condition of the service-based grouping or a first level or a second level of the two-level grouping being service-based grouping, the method further comprises: receiving a parameter used in grouping; computing or receiving a value of the parameter; and receiving grouping parameters. When the grouping parameters include a plurality of thresholds. The group_ID is calculated based on the value of the parameter and the plurality of thresholds. When the grouping parameters include a minimum value, a maximum value and the number of groups, the group_ID is calculated based on the value of the parameter, the minimum value, the maximum value and the number of groups. When, in the condition that the second level of the two-level grouping is service-based grouping, the grouping parameters further include the number of groups for the second level of the two-level grouping, the group_ID is further computed based on the values of the parameter in a first level group and the number of groups for the second level of the two-level grouping. The grouping parameters may be TA-specific, or eNB-specific, or UE-specific, or PO-specific, or eNB-specific and time-specific.

In some embodiment, the grouping rule information is received by paging, or by TAU or Attach procedure from a network node, or by RRC signaling or SIB information from a base unit.

In some embodiment, the grouping rule information can be enabled or disabled implicitly or explicitly. In the condition that the service-based grouping is disabled, the UE_ID based grouping is applied.hj In some embodiment, the method further comprises: reporting a function of the remote unit, the function indicates grouping rule(s) supported by the remote unit. The method may further comprises: transmitting a parameter used in grouping, wherein the parameter is one of paging probability, service period, rating or frequency of service, and rating or frequency of service in a fixed cycle.

In another embodiment, a method at a base unit comprises: transmitting grouping rule information to trigger a remote unit to compute a group_ID based on at least the grouping rule information.

In yet another embodiment, a method at a control node comprises: transmitting grouping rule information to trigger a remote unit to compute a group_ID based on at least the grouping rule information.

In further embodiment, a remote unit comprises: a receiver configured to receive grouping rule information; and a processor configured to compute a group_ID based on at least the grouping rule information.

In yet further embodiment, a base unit comprises: a transmitter configured to transmit grouping rule information to trigger a remote unit to compute a group_ID based on at least the grouping rule information.

In still further embodiment, a control node comprises: a transmitter configured to transmit grouping rule information to trigger a remote unit to compute a group_ID based on at least the grouping rule information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered as limiting of scope, the embodiments will be described and explained with additional specificity and detail using accompanying drawings, in which.

DETAILED DESCRIPTION

Figure 1:
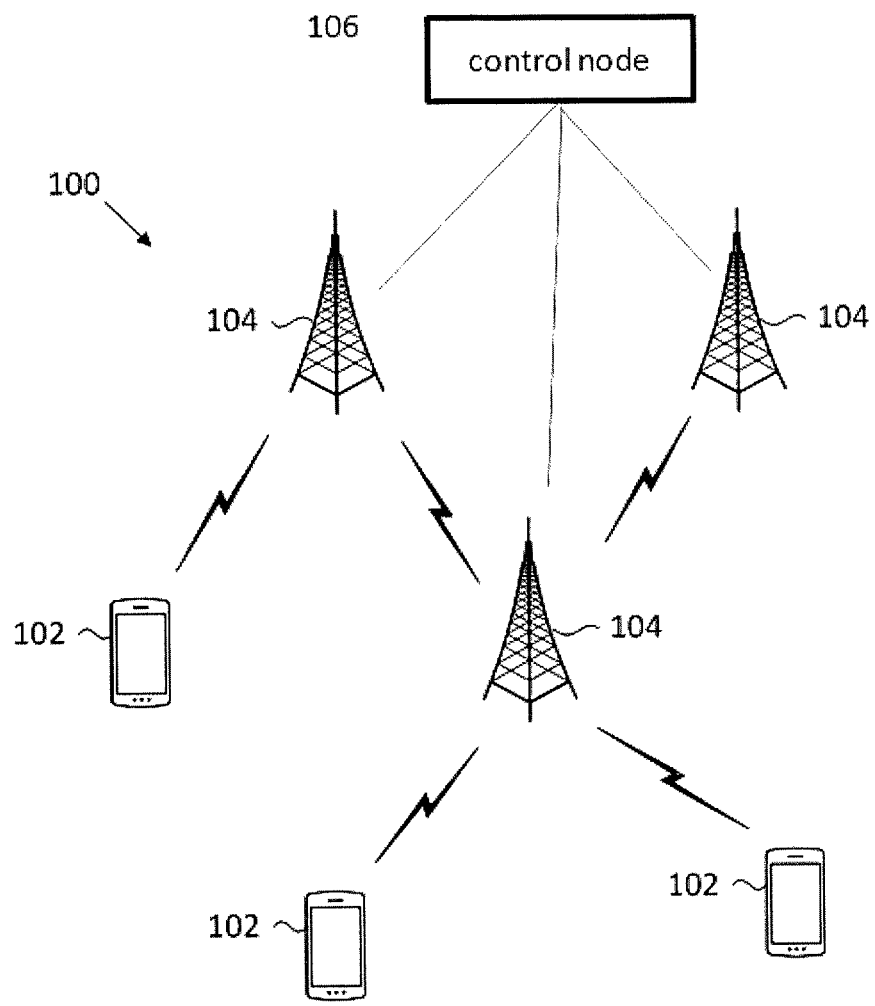
FIG. 1 is a schematic block diagram illustrating one embodiment of a wireless communication system.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for UE grouping. In one embodiment, the wireless communication system 100 includes remote units 102, base units 104 and a control node 106. Even though a specific number of remote units 102 and base units 104 are depicted in FIG. 1, one skilled in the art will recognize that any number of remote units 102 and base units 104 may be included in the wireless communication system 100.

In one embodiment, the remote units 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, user equipment (UE), user terminals, a device, or by other terminology used in the art. The remote units 102 may be Narrow Band Internet of Things (NB-IoT) terminals.

The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated, but are well known generally by those having ordinary skill in the art.

In one implementation, the wireless communication system 100 is compliant with 3GPP 5G new radio (NR). More generally, however, the wireless communication system 100 may implement some other open or proprietary communication protocol.

The base units 104 may serve a number of remote units 102 within a serving area, for example, a cell (or a cell sector) or more cells via a wireless communication link. The base units 104 transmit DL communication signals to serve the remote units 102 in the time, frequency, and/or spatial domain.

The control node 106 is a control plane network element that handles signaling related to mobility and security for the remote units 102. For example, the control node 106 may be a Mobility Management Entity (MME).

Figure 2:
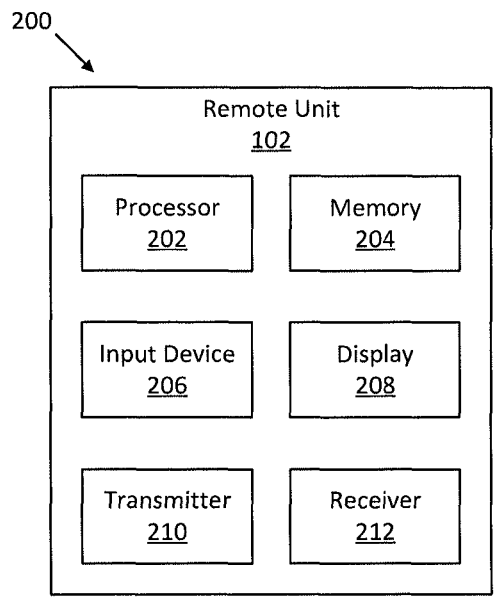
FIG. 2 is a schematic block diagram illustrating one embodiment of an apparatus that may be used for UE grouping.

FIG. 2 depicts one embodiment of an apparatus 200 that may be used for UE grouping. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touch screen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touch screen or similar touch-sensitive display. In some embodiments, the input device 206 includes a touch screen such that text may be input using a virtual keyboard displayed on the touch screen and/or by handwriting on the touch screen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touch screen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the transmitter 210 and the receiver 212 may transmit and receive resources via different cells. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
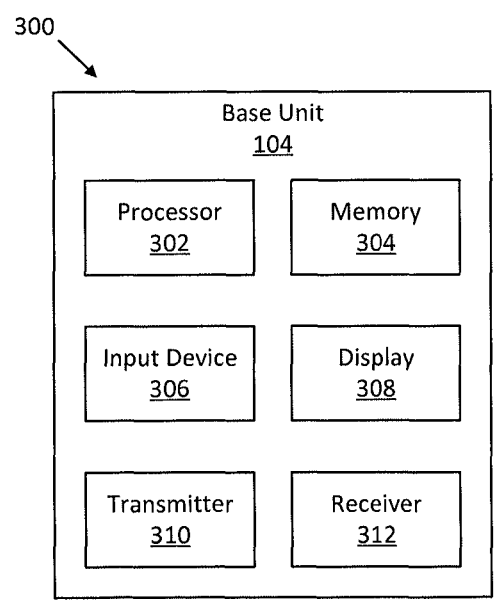
FIG. 3 is a schematic block diagram illustrating one embodiment of another apparatus that may be used for UE grouping.

FIG. 3 depicts one embodiment of another apparatus 300 that may be used for UE grouping. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
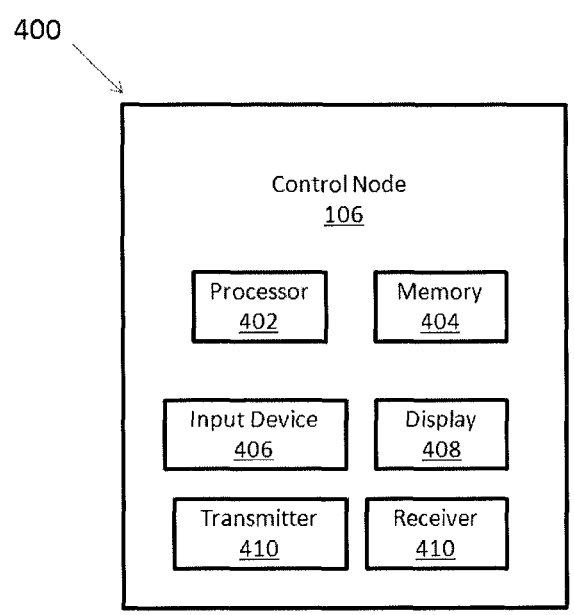
FIG. 4 is a schematic block diagram illustrating one embodiment of yet another apparatus that may be used for UE grouping.

FIG. 4 depicts one embodiment of another apparatus 400 that may be used for UE grouping. The apparatus 400 includes one embodiment of the control node 106. Furthermore, the control node 106 may include at least one of a processor 402, a memory 404, an input device 406, a display 408, a transmitter 410 and a receiver 412. As may be appreciated, the processor 402, the memory 404, the input device 406, the display 408, the transmitter 410 and the receiver 412 may be substantially similar to the processor 202, the memory 204, the input device 206, the display 208, the transmitter 210, and the receiver 212 of the remote unit 102, respectively.

Figure 5:
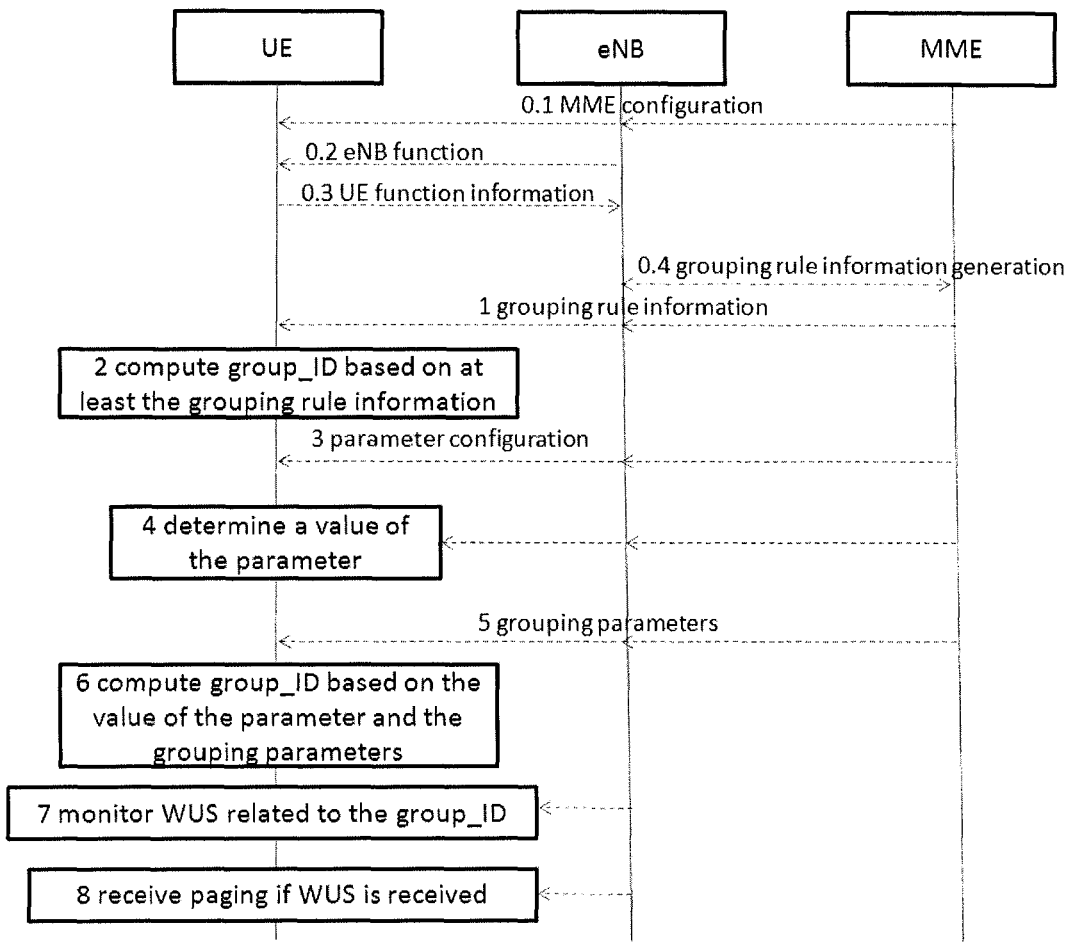
FIG. 5 is a flow chart diagram illustrating a method for UE grouping.

FIG. 5 shows a method for UE grouping according to an embodiment.

In step 0.1, the MME sends MME configuration to UE through eNB. The MME configuration could include information on whether or not the MME supports UE WUS grouping. In the condition that the MME supports UE WUS grouping, the MME configuration could include whether the MME supports at least one of UE UE_ID-based grouping, service-based grouping, and/or two-level grouping. The MME configuration could include UE parameter information used for service-base grouping. This configuration could support UE service-based grouping implicitly. This MME configuration could be sent in TAU procedure or in Attach procedure. Alternatively, this MME configuration could be sent in paging or SIB information through eNB.

The two-level grouping means that the UEs could be grouped in two steps (two levels). The two-level grouping could be service-based and service-based grouping, or service-based and UE_ID-based grouping, or UE_ID-based and service-based grouping. The service-based and service-based grouping may mean that UEs will be grouped firstly by a first level service-based grouping, then one group set of UEs that is grouped by the first level service-based grouping will be further grouped by a second level service-based grouping. The second level service-based grouping may make more groups for the group set of UEs that is grouped by the first level service-based grouping. The service-based and UE_ID-based grouping may mean UEs will be grouped firstly by service-based grouping, then one group set of UEs that is grouped by the service-based grouping will be further grouped by UE_ID-based grouping. The UE_ID-based and service-based grouping may mean UEs will be grouped firstly by UE_ID-based grouping, then one group set of UEs that is grouped by the UE_ID-based grouping will be further grouped by service-based grouping.

In step 0.2, the eNB sends eNB function information to the UE. The eNB function information may be sent by Radio Resource Control (RRC) signaling, by System Information Block (SIB) information, or by paging. The eNB function information may include information on whether or not the eNB supports WUS grouping. In the condition that the eNB supports WUS grouping, the eNB function information may include information on whether the eNB supports at least one of UE_ID-based grouping, service-based grouping, and/or two-level grouping. The eNB function information could include UE parameter information used for service-base grouping. This eNB function information could support UE service-based grouping implicitly. Alternatively, the eNB function information could include UE grouping parameter information used for service-base grouping. This eNB function information could support UE service-based grouping implicitly. The eNB function information could be sent in paging or SIB information by eNB.

In step 0.3, the UE reports its function (UE function) to the eNB. The UE function may be determined based on its capability (UE capability), the MME configuration and the eNB function information. The UE function may indicate the following information: whether the UE supports WUS grouping; in the condition that the UE supports WUS grouping, whether the UE supports UE_ID-based grouping, service-based grouping, and/or two-level grouping; and in the condition of service-based grouping, what parameter is supported. The parameter for the service-based grouping will be discussed later. Incidentally, the UE function may be determined by the UE based on other factors. For example, even if the UE actually supports two-level grouping, the UE may report that it does not support the two-level grouping.

The steps 0.1-0.3 may not be necessary to be performed. The MME configuration, the eNB function information and the UE function may be predetermined. The UE function may also be known by the eNB or the MME.

In step 0.4, the grouping rule information is generated. The grouping rule information indicates that at least one of UE_ID-based grouping, service-based grouping, and two-level grouping would be used to compute group_ID. The grouping rule information may be generated by the eNB or by the MME. The grouping rule information may be generated based on at least one of the UE function, the MME configuration and the eNB function information. The grouping rule information may include at least one of the UE function, the MME configuration and the eNB function information. The eNB function information may include information on whether the eNB supports at least one of UE_ID-based grouping, service-based grouping, and/or two-level grouping. eNB supports at least one of UE_ID-based grouping, service-based grouping, and/or two-level grouping by explicit way or implicit way.

In step 1, there are various ways to send the grouping rule information to the UE.

One possible way to send the grouping rule information to the UE is by using UE attach procedure or TAU (Tracking Area Update) procedure. The attach or TAU procedure is performed between the UE and MME through the eNB. Therefore, when the grouping rule information is determined by the MME, it is preferable to send the grouping rule information by UE attach or TAU procedure.

Another possible way to send the grouping rule information to the UE is by RRC signaling or SIB from eNB. When the grouping rule information is determined by the eNB, it is preferable to send the grouping rule information by RRC signaling or SIB from the eNB. Incidentally, when the grouping rule information is determined by the eNB, the eNB may notify the MME about the grouping rule information.

Yet another possible way to send the grouping rule information is by indicating in paging information. In the paging information, the service-based grouping could be enabled or disabled. When the service-based grouping is disabled, the UE_ID-based grouping will be used for the UE implicitly, so long as the UE function indicates that the UE supports the UE_ID-based grouping and eNB is able to configure the UE_ID-based grouping. When the service-based grouping is enabled, the UE_ID-based grouping and service-based grouping will be used for the UE, or the service-based grouping and UE_ID-based grouping will be used for the UE.

In step 2, the UE, upon receiving the grouping rule information, computes a group_ID based on at least the grouping rule information.

If the UE_ID-based grouping is indicated in the grouping rule information, the UE uses a MOD calculation to compute the group_ID. If the service-based grouping or two-level grouping is indicated in the grouping rule information, more information is necessary for the UE to compute the group_ID.

A timer or time information could be applied to service-based grouping or a first level or a second level of the two-level grouping being service-based grouping. When timer or time based on time information is expired, the service-based grouping or a first level or a second level of the two-level grouping being service-based grouping will be stopped. The UE receives this timer or time information from the MME or the eNB.

For the service-based grouping, how to group UE based on a specific parameter has been discussed.

Service-ID and traffic pattern had been proposed to be used for the service-based grouping. However, based on the review on specification TS23.401 and TS45.820, service-ID and traffic pattern are not suitable to be used. Service-ID is just the service-type information like the MO (Mobile Originating) or MT (Mobile Terminated) service by CS (Circuit Switch) or PS (Packet Switch), which could be not be used for grouping. The traffic pattern including network command is the same to all the UEs, which could be not be used for grouping, either.

In this disclosure, we propose the following parameters for use in the service-based grouping: paging probability, service period, rating or frequency of service, and rating or frequency of service in a fixed cycle.

The paging probability is related to the times of service generating (paging) in a first period T1 and the number of paging occasions in a second period T2. The second period T2 may be the same as the first period T1. In particular, the paging probability is proportional to the times of service generating (paging) and inversely proportional to the number of paging occasions. More specifically, the paging probability is the ratio of the times of service generating (paging) in a first period T1 to the number of paging occasions in the second period T2.

The service period means period of service (or paging) in UE or time gap of two continuous services (or pagings) in UE. For example, UE1 reports its data per day while UE2 reports its data per hour. Therefore, the service period of UE1 is one day, and the service period of UE2 is one hour.

The rating or frequency of service means the service generating times in a predetermined period T3.

The rating or frequency of service in a fixed cycle means means the times of service generating in a fixed cycle. For example, the service may be a DL (downlink) CN (Core Network) command.

In step 3, the eNB or the MME sends the parameter configuration to the UE in a similar manner to the transmission of the grouping rule information In step 4, upon receiving the parameter configuration, i.e. which parameter is used for the service-based grouping, the UE determines a value of the parameter for the UE.

The value of the parameter may be computed at the UE. Alternatively, the value of the parameter may be computed at the eNB or the MME and transmitted to the UE in a similar manner to the transmission of the grouping rule information The grouping parameters are determined at the eNB or the MME and transmitted to the UE in a similar manner to the transmission of the grouping rule information. The value of the parameter and the grouping parameters are used for the UE to compute its group_ID.

On the other hand, it is also possible that the eNB or the MME determines the group_ID by using the value of the parameter and the grouping parameters, and sends the determined group_ID to the UE.

Different methods may be used to compute the group_ID.

Figure 6:
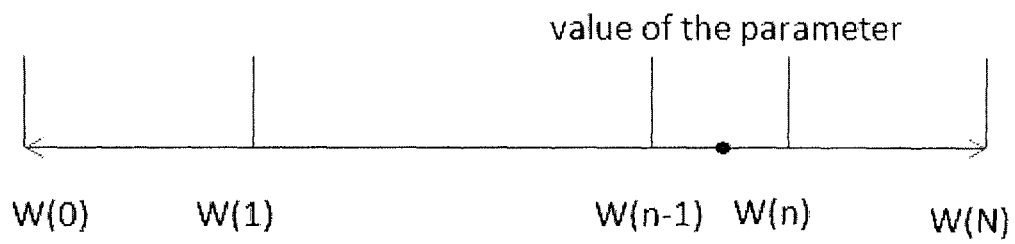
FIG. 6 is a diagram illustrating a threshold-based method for computing group_ID.

In a first method, the group_ID is computed by a threshold-based method as shown in FIG. 6. As shown in FIG. 6, when the value of the parameter is in a zone between W(n−1) and W(n), the group_ID is computed as n. In particular, W(0)-W(n) are pre-determined thresholds. All of the values of the parameter falling within the zone from W(0)-W(1) belong to the first group, i.e. the group_ID=1. Similarly, the group ID for all of the values of the parameter falling within the zone from W(n−1)-W(n) is n. Incidentally, if the value of the parameter equals to W(n), its group_ID is n, except that if the value of the parameter equals to W(0), its group_ID is 1.

Needless to say, the number of thresholds could be equal to the number of the groups (N) plus 1.

For example, suppose that the number of the groups is 3, and W(0)=0, W(1)=0.4, W(2)=0.7, W(3)=1, zone1 is the zone from W(0) to W(1), zone2 is the zone from W(1) to W(2), zone3 is the zone from (W2) to W(3). If the value of the parameter (x) for a UE is equal to 0.65 then x falls within the zone2. Accordingly, the group ID for the UE is 2.

For another example, if the parameter is associated to service period and suppose that the number of the groups is 3, and W(0)=0 hours, W(1)=12 hours, W(2)=24 hours, W(3)=+infinite hours, then zone1 is the zone from W(0) to W(1), zone2 is the zone from W(1) to W(2), zone3 is the zone from W(2) to W(3). If the value of the parameter (x) for a UE is equal to 4 hours then x falls within the zone1. Accordingly, the group ID for the UE is 1.

Needless to say, the number of thresholds could be equal to the number of the groups (N) plus 1, or groups(N)−1, where the W(0) and W(N) are stored by UE according to the specification.

For yet another example, if the parameter is frequency of service and suppose that the number of the groups is 3, and W(0)=0, W(1)=50, W(2)=100, W(3)=+infinite hours, then zone1 is the zone from W(0) to W(1), zone2 is the zone from W(1) to W(2), zone3 is the zone from (W2) to W(3). If the value of the parameter (x) for a UE is equal to 120 then x falls within the zone3. Accordingly, the group ID for the UE is 3.

Needless to say, the number of thresholds could be equal to the number of the groups (N) plus 1, or groups(N)−1, where the W(0) and W(N) are stored by UE according to the specification. This above methods using thresholds could also be applied to other types of parameters. The parameters could be rating or frequency of service, rating or frequency of service in a fixed cycle, or paging frequency.

The thresholds W(0)-W(n), or W(1)-W(N−1) may be configured by the eNB or the MME and sent to the UE.

Figure 7:
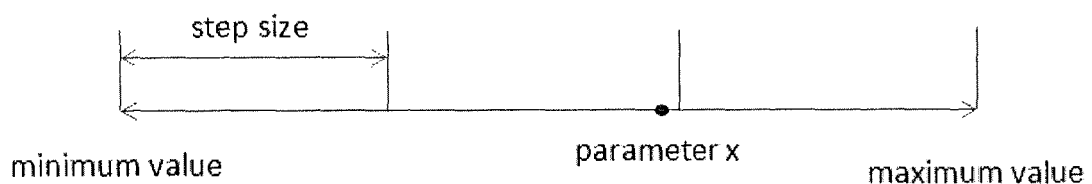
FIG. 7 is a diagram illustrating a second method for computing group_ID.

In a second method, the group_ID is computed by the following equation: group_ID=ceil ((parameter x−minimum value)/step size), wherein step size=(maximum value−minimum value)/the number of groups. The maximum value and the minimum value represent the upper limit and the lower limit of the thresholds, and are pre-determined. FIG. 7 shows the second method.

For example, suppose that the number of the groups is 3, and the minimum value (i.e. the lower limit of the thresholds) is 0, the maximum value (i.e. the upper limit of the thresholds) is 1, then the step size=(1−0)/3=0.33 (1/3). If UE parameter x=0.65, then the group_ID=ceil ((0.65−0)/0.33) =2. Accordingly, the group ID for the UE is 2. In other words, thresholds 0, 0.33 (1/3), 0.66 (2/3) and 1 are calculated so that the values of the parameter falling within 0 and 0.33 (1/3) belong to group1, falling within 0.33 (1/3) and 0.66 (2/3) belong to group2, and falling within 0.66 (2/3) and 1 belong to group3.

Incidentally, given a specific number of the groups, since the step size can be calculated from the maximum value and the minimum value, it is also possible that the maximum value and the step size are predetermined (because the minimum value can be calculated from the maximum value and the step size) or the minimum value and the step size are predetermined (because the maximum value can be calculated from the minimum value and the step size). The step size could also be configured to UE by MME or eNB. The UE could receive the step size from MME or eNB, and computer its group ID based on this step size.

The above method using thresholds could also be applied to grouping with other types of parameters. The parameters could be rating or frequency of service, rating or frequency of service in a fixed cycle, or paging frequency.

In view of the above, the thresholds are calculated from the paging parameter (i.e. any two of the maximum value, the minimum value and the step size) and the number of groups. There are various ways to determine the paging parameter and the number of groups by MME and/or eNB.

For example, the paging parameter is configured by the MME and sent to the eNB. The eNB may determine the number of groups and receive the paging parameter from the MME, and use them to calculate the thresholds. In a second alternative, the paging parameter is configured by the MME, and the number of groups is determined by the eNB and sent to the MME. The MME uses the paging parameter received from the eNB and the paging parameter to calculate the thresholds. In a third alternative, both the paging parameter and the number of groups are configured by the MME. The MME uses them to calculate the thresholds. In a fourth alternative, both the paging parameter and the number of groups are determined by the eNB. The eNB uses them to calculate the thresholds. After the thresholds are calculated, they are transmitted to the UE from the eNB or the MME.

A third method applies to a second level grouping in the two-level grouping being service-based grouping. The first method or the second method may be used in a first level grouping being service-based grouping. After the first level grouping, there might be a situation in which a particular zone has a large number of UEs. For example, there are 10 UEs with parameters between 0.2-0.8. These UEs could be further grouped into two sub-groups with a new threshold=sum of (UEs' values of the parameter)/the number of UEs. If there are more (more than two) sub-groups configured for the second level grouping, the thresholds for the sub-groups could be computed as follows:

The number of UEs in a first level group is M. UE is reordered based on ascending parameters in the first level of the two-level grouping. The reordered UE could be noted as UE1 to UE M. The threshold parameters for a second level of the two-level grouping N' could be parameter of UE_m, where m=k*floor (M/N'), k=1, . . . , N'−1, or m=k*ceil (M/N'), k=1, . . . , N'−1, where N' is the number of second level groups for the UE in first level group.

For example, there are 10 UEs (i.e. M=10) with the values of the parameter from 0.2 to 0.8, the 10 UEs' values could be 0.3 for 3 UEs (UE1 to UE3), 0.6 for 2 UEs (UE4 to UE5), 0.7 for 3 UEs (UE6 to UE8) and 0.75 for 2 UEs (UE9 to UE10), and the number of sub-groups for the second level grouping is 3.

The thresholds could be determined as threshold1=0.3 (the value of the parameter of UE3), threshold 2=0.7 (the value of the parameter of UE6). Thus the UE1, UE2, UE3 will be in a group1, UE4 to UE8 will be in a group2, UE9 and UE10 will in a group3. Incidentally, since UE7 and UE8 have the same value 0.6 as UE6, they (UE7 and UE8) are also in the group2. This grouping result supports a principle that similar parameters will be in the same group, and the number of UEs in each group is similar to each other, which could avoid the defect that too many UEs are in the same group to reduce the efficiency of grouping.

The thresholds used for the sub-groups may be referred to as sub-thresholds. The sub-thresholds may be configured in a similar manner to the first method, i.e. configured by the eNB or the MME and sent to the UE. Alternatively, the sub-thresholds may be calculated in a similar manner to the second method, i.e. calculated by the eNB or the MME and sent to the UE.

The above method using thresholds could also be applied to grouping with other types of parameters. The parameters could be service period, rating or frequency of service, rating or frequency of service in a fixed cycle, or paging frequency.

In all of the above-described methods 1-3, the parameter could be any one of paging probability, service period, rating or frequency of service, and rating or frequency of service in a fixed cycle. The parameter could be also be paging frequency, or paging cycle. Service period could be named as paging period. Rating or frequency of service could be named as rating or frequency of paging.

The preferable parameter is the paging probability or the service period.

In the service-based and service-based grouping, the same parameter or different parameters may be used in a first level service-based grouping and a second level service-based grouping.

Considering that the service may be time-specific. For example, suppose that the UE is a street light that may be turned ON or OFF at night or in the morning, the parameters (for example the paging probabilities) are different in different time periods. Therefore, the grouping parameters may be different in different time periods.

Therefore, the grouping parameters may be TA (Tracking Area)-specific, or eNB-specific, or UE-specific, or PO (paging occasion)-specific, or eNB-specific and time-specific. For TA (Tracking Area)-specific grouping parameters, the grouping parameters may be the same for UEs in a Tracking area. The grouping parameters could be sent to the UE by the MME in TAU or attach procedure, or by the MME or the eNB by paging information or System information. For eNB-specific grouping parameters, the grouping parameters may be the same for UEs in a eNB area. For UE-specific grouping parameters, the grouping parameters may be configured to an individual UE. For PO (paging occasion)-specific, the grouping parameters may be configured based on a specific paging occasion position. For eNB-specific and time-specific grouping parameters, the grouping parameters may be the same for UEs in a eNB, and could be associated to the time information. The grouping parameters here are the parameters used to grouping. For example, grouping parameters could be the thresholds to group the UE based on UE's parameter value. The grouping parameters could be sent to the UE by the MME in TAU or attach procedure, or by MME or eNB by paging information or System information.

In step 7, the UE monitors WUS related to the group_ID. Here, the WUS with single sequence CDM could be multiplexed by UEs based on different group rules. A WUS with single sequence CDM means that one type of group set is associated to a WUS. Accordingly, only one WUS needs to be transmitted no matter what kind of group set is shown. The WUS with single sequence CDM is designed based on Code information. The Code information could be designed by at least one of frequency domain orthogonal cover codes, scrambling initialization, phase shifted scrambling codes, and Zadoff-Chu phase shift. For example, the WUS with single sequence CDM for service-based grouping could be TDM (Time-Division Multiplexing) with the WSU with single sequence CDM for UE-ID based grouping. The WUS with single sequence CDM for service-based grouping could be FDM (Frequency-Division Multiplexing) with the WSU with single sequence CDM for UE-ID based grouping. Thus, the WUS with single sequence CDM could be multiplexed by UEs based on different group rules The multiplexing method could be one of TDM, FDM or CDM, or the combination of TDM, FDM and CDM. The WUS with single sequence CDM could also be used for two-level grouping. Here, a group set, for example, means that UEs in group_n within the group set is paged or not, where n could be from 0 to N−1, N is the number of groups. The group set, for example, could be a set consisted by group1, group2, group5, this means at least one of UEs in group1, at least one of UEs in group2, and at least one of UEs in group5 are paged. The offset in time domain between a WUS with single sequence CDM for one UE grouping rule and a WUS with single sequence CDM for another UE grouping rule will be transmitted to UE. UE will receive the offset in time domain between a WUS with single sequence CDM for one UE grouping rule and a WUS with single sequence CDM for another UE grouping rule from eNB or MME. Based on this offset, UE will monitor the WUS associated to its grouping rule.

In step 8, once the WUS is received, the UE receives paging in a paging occasion. As described above, the paging information may also include an indication that the service-based grouping is enabled or disabled for the next WUS.

In this document, the paging times could be the paging times caused by service, or the paging times caused by service and paging by System information updating. The paging could be the paging caused by service, or the paging caused by service and caused by System information updating.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
receiving grouping rule information from a mobile management entity (MME) that indicates one or more groups supported by the MME, wherein the grouping rule information comprises a paging probability; and
computing a group identifier (ID) using the paging probability and a modulo calculation.

2. The method of claim 1, wherein the grouping rule information indicates that the group ID is computed based on two-level grouping.

3. The method of claim 2, wherein the two-level grouping includes service-based and service-based grouping, service-based and UE ID based grouping, or UE ID based and service-based grouping.

4. The method of claim 2, wherein, in response to a service-based grouping or a first level or a second level of the two-level grouping being service-based grouping, the method further comprises: receiving a parameter used in grouping, wherein the parameter comprises paging probability, service period, rating or frequency of service, or rating or frequency of service in a fixed cycle.

5. The method of claim 4, wherein the paging probability corresponds to paging times in a first period T1 and a number of paging occasions in a second period T2.

6. The method of claim 4, wherein the service period corresponds to a period of paging in the UE or a time gap between two continuous pagings.

7. The method of claim 2, wherein, in response to a service-based grouping or a first level or a second level of the two-level grouping being service-based grouping, the method further comprises: computing or receiving a value of a parameter and receiving grouping parameters.

8. The method of claim 7, wherein the grouping parameters include a plurality of thresholds, and the group ID is calculated based on the value of the parameter and the plurality of thresholds.

9. A user equipment (UE), comprising:
at least one memory; and
at least one processor coupled with the at least one memory and configured to cause the UE to:
receive grouping rule information from a mobile management entity (MME) that indicates one or more groups supported by the MME, wherein the grouping rule information comprises a paging probability; and
compute a group identifier (ID) using the paging probability and a modulo calculation.

10. The UE of claim 9, wherein the grouping rule information indicates that the group ID is computed based on two-level grouping.

11. The UE of claim 10, wherein the two-level grouping includes service-based and service-based grouping, service-based and UE ID based grouping, or UE ID based and service-based grouping.

12. The UE of claim 10, wherein, in response to a service-based grouping or a first level or a second level of two-level grouping being service-based grouping, the at least one processor is configured to cause the UE to receive a parameter used in grouping, wherein the parameter comprises paging probability, service period, rating or frequency of service, or rating or frequency of service in a fixed cycle.

13. The UE of claim 10, wherein, in response to a service-based grouping or a first level or a second level of two-level grouping being service-based grouping, the at least one processor is configured to cause the UE to receive a parameter used in grouping; a value of the parameter is computed or received by the at least one processor; and the at least one processor is configured to cause the UE to receive grouping parameters.

14. The UE of claim 13, wherein the grouping parameters include a plurality of thresholds, and the group identifier is calculated based on the value of the parameter and the plurality of thresholds.

\* \* \* \* \*